US011525836B2

(12) United States Patent
Wales et al.

(10) Patent No.: US 11,525,836 B2
(45) Date of Patent: Dec. 13, 2022

(54) AUTOMATED BIOPROCESS DEVELOPMENT

(71) Applicant: The Automation Partnership (Cambridge) Limited, Royston (GB)

(72) Inventors: Richard Wales, Cambridgeshire (GB); Patrick Courtney, Ealing (GB)

(73) Assignee: The Automation Partnership (Cambridge) Limited, Royston (GB)

( * ) Notice: Subject to any disclaimer, the term of this patent is extended or adjusted under 35 U.S.C. 154(b) by 275 days.

(21) Appl. No.: 16/095,981

(22) PCT Filed: May 12, 2017

(86) PCT No.: PCT/GB2017/051326
§ 371 (c)(1),
(2) Date: Oct. 24, 2018

(87) PCT Pub. No.: WO2017/199006
PCT Pub. Date: Nov. 23, 2017

(65) Prior Publication Data
US 2019/0154713 A1 May 23, 2019

(30) Foreign Application Priority Data
May 17, 2016 (GB) ..................... 1608683

(51) Int. Cl.
*G01N 35/00* (2006.01)
*G05B 13/02* (2006.01)
(Continued)

(52) U.S. Cl.
CPC ....... *G01N 35/00584* (2013.01); *G01N 31/00* (2013.01); *G05B 13/024* (2013.01);
(Continued)

(58) Field of Classification Search
CPC ............ G01N 35/00584; G01N 31/00; G05B 13/024; G05B 15/02; G05B 13/026;
(Continued)

(56) References Cited

U.S. PATENT DOCUMENTS 6,381,554 B1 * 4/2002 Matsuo ................ G05B 13/026
702/174
6,455,316 B1 * 9/2002 Turner .............. B01F 15/00207
374/E13.001
(Continued)

FOREIGN PATENT DOCUMENTS

| DE | 102013200822 A1 | 2/2014 |
|---|---|---|
| DE | 202014103250 U1 | 7/2014 |

(Continued)

OTHER PUBLICATIONS

International Search Report issued in International Application No. PCT/GB2017/051326 dated Jul. 13, 2017.
(Continued)

*Primary Examiner* — Tarun Sinha
*Assistant Examiner* — Yossef Korang-Beheshti
(74) *Attorney, Agent, or Firm* — Quinn IP Law

(57) ABSTRACT

A method for automating process development in a bioprocessing environment is provided. The method comprising: executing a first experiment run according to a set of parameters; retrieving a first real-time set of data of the experiment run while the experiment run is being executed; retrieving a second real-time set of data of an experiment run being executed in parallel, analysing the retrieved first real-time set of data and the second real-time set of data to determine an adjusted set of parameters; and, modifying, based on the analysis, the parameters upon which the experiment run is being executed during execution of the run such that the run continues to be executed according to the
(Continued)

modified set of parameters. A system, computer program and computer readable medium are also provided.

17 Claims, 4 Drawing Sheets

(51) Int. Cl.
  *G05B 15/02* (2006.01)
  *G01N 31/00* (2006.01)
(52) U.S. Cl.
  CPC ............ *G05B 15/02* (2013.01); *G05B 13/026* (2013.01); *G05B 13/0265* (2013.01)
(58) Field of Classification Search
  CPC .. G05B 13/0265; G05B 13/02; B01J 19/0006; B01J 19/0046; B01J 2219/0068
  See application file for complete search history.

(56) References Cited

U.S. PATENT DOCUMENTS

| | | |
|---|---|---|
| 6,489,168 B1 | 12/2002 | Wang et al. |
| 6,727,096 B1 | 4/2004 | Wang et al. |
| 8,943,163 B2 | 1/2015 | Cooney, Jr. et al. |
| 10,030,222 B2* | 7/2018 | Erm ................. C12M 45/20 |
| 2003/0036207 A1* | 2/2003 | Washburn ............ G16B 50/00 436/518 |
| 2004/0033166 A1 | 2/2004 | Arnowitz et al. |
| 2005/0137735 A1 | 6/2005 | Loy et al. |
| 2007/0048863 A1 | 3/2007 | Rodgers et al. |
| 2008/0103747 A1 | 5/2008 | Macharia et al. |
| 2008/0252886 A1 | 10/2008 | Bodenstaff et al. |
| 2010/0250147 A1 | 9/2010 | Verseput |
| 2011/0312003 A1 | 12/2011 | Budaraju et al. |
| 2015/0369013 A1* | 12/2015 | Weatherhead ......... G05B 15/02 700/275 |
| 2018/0190386 A1* | 7/2018 | Yoshikawa ............ G06Q 10/00 |

FOREIGN PATENT DOCUMENTS

| | | |
|---|---|---|
| WO | 0226342 A1 | 4/2002 |
| WO | 02077772 A2 | 10/2002 |
| WO | 02093297 A2 | 11/2002 |
| WO | 2006065918 A2 | 6/2006 |
| WO | 2010022391 A9 | 2/2010 |
| WO | 2017004468 A1 | 1/2017 |
| WO | 2017072340 A1 | 5/2017 |

OTHER PUBLICATIONS

Chachuat, B. et al., "Model Parameterization Tailored to Real-time Optimization", 18th European Symposium on Computer Aided Process Engineering, 2008, Elsevier B.V.
Yakut, N. et al., "Online Model-Based Redesign of Experiments for Parameter Estimation Applied to Closed-loop Controller Tuning", Chemical Engineering Transactions, 2013, vol. 32, The Italian Association of Chemical Engineering.
Teixeira, A. P. et al., "Hybrid elementary flux analysis/nonparametric modeling: application for biorocess control", BioMed Central, Jan. 29, 2007, BMC Bioinformatics.
"Bioprocess intensification through Process Analytical Technology (PAT) and Quality by Design (QbD)", 4th BioProScale Symposium, Apr. 6-8, 2016, Institute for Biotechnology and Fermentation Berlin, Berlin, Germany.
Cruz B., M. Nicolas, "Robot based bioprocess development by automated on-line optimal re-design in parallel bioreactors", Institute of Biotechnology.
Knepper, Dr. A. et al., "Automated bioprocess development does standardization make sense?", Chem. Ind. Tech., 2014, 1379-1383, No. 9, Germany.
Maurer, M. J. et al., "Automated Bioreactor Sampling—Process Trigger Sampling for Enhancing Microbial Strain Characterization", eppendorf, Jan. 2015, No. 298.
Craven, S. et al., "A Quality-by-Design Approach to Upstream Bioprocess Interrogation and Intesnsification", Eppendorf, Sep. 2016, No. 300.
Wu, T. et al., "An Intelligent Automation Platform for Rapid Biioprocess Design", Journal of Laboratory Automation, 2014, p. 381-393, No. 19(4).
Galvanin, F. et al., "Towards on-line model-based design of experiments", 18th European Symposium on Computer Aided Process Engineering, 2008, 6 pages, Elsevier B.V., Padova, Italy.
Galvanin, F. et al., "Online Model-Based Redesign of Experiments for Parameter Estimation in Dynamic Systems", American Chemical Society, Mar. 26, 2009, Padova, Italy.
Limberg, M. H. et al., "Simulating Process Limitation in Microbial Cultivation: A Parallel Two-Compartment Scale-Down Approach", Eppendorf, Feb. 2016, No. 301.
Barz, T. et al., "Experimental Evaluation of an Approach to Online Redesign of Experiments for Parameter Determination", American Institute of Chemical Engineers, Dec. 3, 2012, Wiley Online Library.

\* cited by examiner

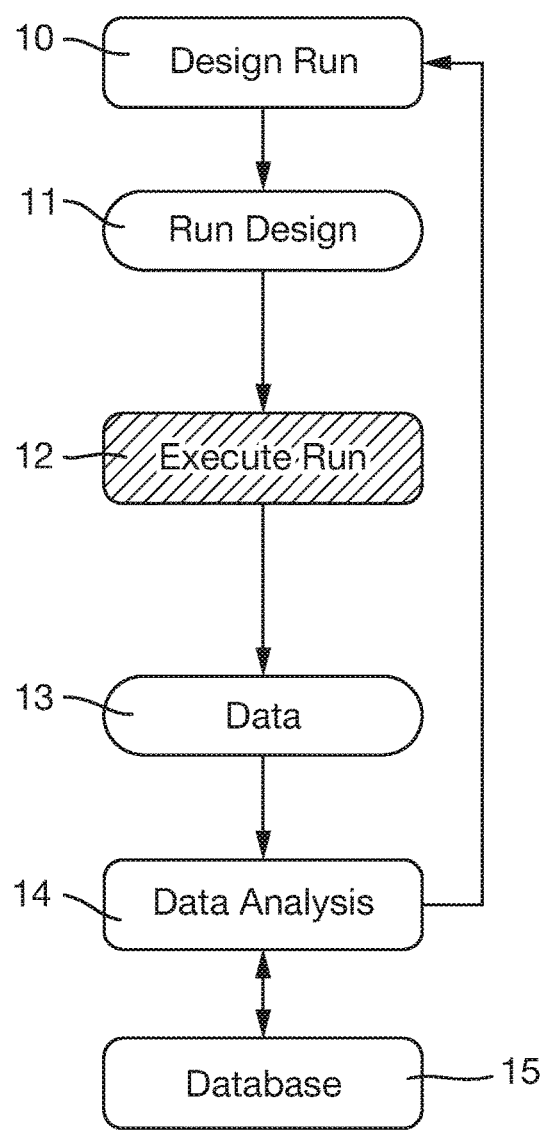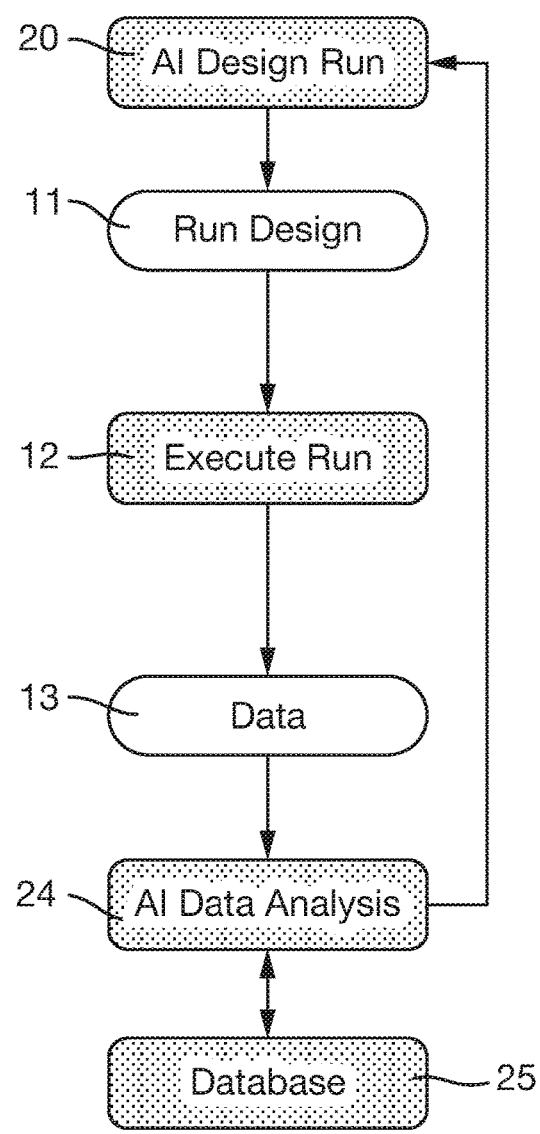

AUTOMATED BIOPROCESS DEVELOPMENT

BACKGROUND

Bioprocess development typically involves statically designed experiments executed as a series of parallel runs in similar systems, in sequence on a single system or individually or in sequence in a parallel system capable of running parallel experiments but less than the total number of experiments required. The key material to be assessed in these experiments is valuable and limited in supply. Prior to experiment execution it is unknown how the material, for example a particular novel new candidate therapeutic protein or group of related such molecules, will respond to certain conditions. Indeed some materials can be particularly sensitive and very small changes in the material, for example a single amino acid in a protein can have a significant and unpredicted effect on the behaviour of the protein.

The current trends in development strategy add to the scale of the challenges in bioprocess development relating to the amount of material available for testing at early stages. One example of a group of such trends that create a specific challenge on material supply are:

i) an interest in understanding very early in the development process which of a number of identified therapeutic protein candidates are most suitable for the small set of manufacturing processes that a developer has adopted as their platform, often generally termed assessment of 'manufacturability';

ii) a focus on injectable formats for biological drugs creating a demand for very high protein concentrations in order to achieve the required dose within a volume that can be tolerated by the patient for injection; and, iii) the increasing production of drugs in a competitive environment that adds to the constraints directing formulations to formats of high usability for patients.

At early stages of, or prior to process development, a critical point at which candidate molecule selection is carried out, typically all unit operations are inefficient and sub-optimal. One example of the type of issue that arises is illustrated by the assessment of the robustness of a protein drug candidate to manufacturing concentration and formulation processes involving ultra-filtration and diafiltration (UF/DF), typically one of the last stages of manufacturing prior to filling of the delivery container. Available bench scale systems for UF/DF have minimum recirculating (operating) volumes in the region of 20-30 ml. The focus for many protein therapeutics is on injectable formulations where in order to keep the injected volume tolerable for the patient but deliver the required dose very high protein concentrations are required, e.g. 150-200 mg/ml being targets for many developer companies. To achieve 200 mg/ml in 25 ml fluid requires 5 g of protein. Whilst 2-3 g/L of product can routinely be achieved as a titre in the manufacturing bioreactor for an optimised process, prior to or at the early stages of process development before optimization yields are much lower, not only in the bioreactor but also in multiple subsequent separation and purification unit operations that precede the UF/DF step. As such a single trial might require an initial supply bioreactor run of 20L or greater. The cost of such scale runs is high, added to this the cost of subsequent work to separate the product from the cell culture and purify the protein (UF/DF is typically the final or penultimate step) is high, which makes significant demand on human and facility resources and of long duration. Where multiple different trial UF/DF runs are required to assess the performance of the candidate in the UF/DF process the scale of the challenge becomes so large that historically such experimentation has been often not carried out and resulted in significant commercial problems where issues arise in late stage manufacturing development. This latter problem may be further exacerbated by approaches in which final process development is deferred until later clinical trial stages and small process changes may impact on protein stability after significant commercial commitment has been made.

An additional complication is that small-scale assessments, for example processes carried out in microtitre plates at μl volumes do not impose the same physical stress on the protein materials and as such do not fully indicate the relative performance of molecules in manufacturing type processes. As such there is a conflict between the cost/effort/duration of obtaining test material and the need for representative manufacturing like processes.

This is further complicated by the fact that multiple candidate molecules require assessment for the selection of the most appropriate ones for the manufacturing platform processes. Additionally, there will be multiple downstream process unit operations for which such assessments are required and further, there may exist multiple standard 'platform' manufacturing processes against which assessments are required, thus creating an extensive matrix of testing.

Additionally, the behaviour of therapeutic proteins may be unpredictable. Such candidate therapeutic proteins may have been modified for multiple purposes; they may be novel fusions of peptide regions never tested before, they may have had their amino acid sequence altered to enhance target binding or to reduce non-specific binding and toxicity issues. This is then to be combined with a range of purification and formulation conditions. As such whilst small-scale e.g. plate based models and in-silico methods can provide guidance the need for practical in-context testing remains.

Typical experimental procedures include statistically based DOE (Design of Experiment) procedures in which a test sample is exposed to a process under multiple sets of values for a defined sub-set of operating parameters. Typically, a full 2-factorial DOE experiment would involve 16 trials with statistically selected values for 2 operating parameters. The standard approach would be to set-up 16 experiments on the same material which further increases the need for test material. One problem is that the ranges selected for the operating parameter values may be unpredictably inappropriate for the test protein in question and it may become apparent during the experiment that the protein is, for example, unstable in a certain range of values for a particular parameter. As such all the material used in the proportion of the experiments using the aforesaid range is effectively wasted. Although contributing to the knowledge of the performance of the molecule the particular performance boundary may have been identified through the use of less test material.

Experimental procedures or individual runs can often take a long time to execute as well. For example, the duration of bioreactor runs may be in excess of 14 days and in the case of perfusion bioreactors over 60 days. In these scenarios it can be impossible to predict how the material will perform. This results in a delay in achieving meaningful results and a large amount of valuable material being wasted before a new experiment can be designed. Conventionally, as described above, the only way to speed up development was to run an ever increasing number of parallel experiments using different operating parameters. In practice in order to reduce the material wasted the number of parallel runs is balanced against the number of re-runs required to produce a meaningful result.

As above, the typical approach to process development is that the scientist uses accumulated knowledge to design a set of parallel experiments exploring multiple operating parameters thought to affect the characteristic(s) for which there is a desired outcome, for example running a bioreactor at different pH settings with different feeds profiles (e.g., feed type and timing/rate of feed delivery) may affect the product yield obtained. Typically, multiple cycles of experimentation are executed with rounds of data analysis and experimental design between them, gradually focusing in on the parameters that impact most on the desired outcome and refining the values for those parameters.

An example flow diagram illustrating such an approach is shown in FIG. 1. The experiment run is first designed manually using statistical design packages (step 10) to create a design for the experimental run (Run Design) (output/input 11). The experimental run is executed (step 12) and data is generated (output 13). The data is analysed manually (step 14) before being stored in a database (step 15). Analysis may of course utilize data already within the database. The results of the data analysis allow the designer to understand the experimental space more completely and to design a second experiment using different parameters focusing on the new defined area of uncertainty and the experiment process starts again. The entire process is iterative, each iteration leading the designer closer to a more certain solution. The use of data analysis packages to assess such experimental data and design an optimal set of experiments for the next stage is well known, for example, DOE or alternatively (an potentially including within them DOE) automated experimental design processes also often referred to as 'robot scientist' approaches.

In environments in which, for example, structure function relationships of molecules and synthetic processes are generally less complex than bioprocessing, such as small molecule synthesis, or for simple bioprocessing unit operations it is known to provide a degree of artificial intelligence, as illustrated in FIG. 2. The complexity and variables are reduced, analysis techniques more comprehensive and the data retrieved from a single run can be easily understood and analysed. The parameters for the experiment are first estimated using algorithm based approaches that might include or be considered to be artificial intelligence (AI, step 20) and then the process continues as illustrated in FIG. 1. Once the experimental data has been collected, it is analysed using the algorithms/AI (step 24) before being passed to a database for storage and retrieval (step 25) and the results being fed back in to the algorithms/AI to iterate to a new experiment design. Such design does not offer reduction in the volume of material required though it may theoretically reduce the number experimental steps to some degree. Such approaches still required significant volumes of material and place a demand on manual labour.

Development of processes and strategies for the manufacturing of biological molecules is complex. Taking the example of the production of therapeutic biological molecules through the culture of microorganisms such as the bacteria E. coli.

Firstly, there are multiple factors in the creation of such recombinant bacterial strains that add complexity. The details of the DNA constructs carrying the gene for a target protein can have a significant effect on the yield achievable, the growth conditions required to achieve any production and also the nature of the product with respect to stability, structure and function.

Additionally, there are interactions between such factors, for example it is widely known that the growth conditions, for example temperature at specific stages of the process may affect the yield of functional protein. At higher temperatures such as 37° C., typical growth conditions for E. coli, the organism may produce high yields of protein but due to the fact that recombinant protein sequences are generally derived from different organisms such proteins are not able to correctly form their 3 dimensional structure during the process of translation in the alien host production organism. Reducing the growth temperature and thus reducing the rate of protein production can in some cases enable the correct co-translational protein folding to occur. Thus, although the yield of the recombinant protein is less at lower temperature the actual yield of 'functional' protein is higher. The complexity of such systems is further illustrated by for example the fact that the nutrition supplied may limit the availability of certain amino acids essential for the target recombinant protein; this in turn may impact on the rates of production of the target protein, thus there being interactions between nutrition and temperature.

These are only two simple factors of many which include; media composition including amino acids, carbon source, micronutrients including metal cofactors and other modulating biological molecules, levels of dissolved gases including oxygen and CO2, pH, and osmolality.

Whilst such multiple factors are found within chemical synthesis processes the number of potential factors in bioprocessing exceeds that. Additionally different production host strains of E. coli will also respond differently to a given mix of growth conditions and DNA constructs. Searching combinations of DNA construct, host production strain and growth conditions occupies significant amount of time in bioprocessing and though some prediction can be made practical experimentation remains the mainstay of the industry due to the complexity.

A further level of complexity found in bioprocessing to a level exceeding that in chemical synthesis arises from the impact of the accumulated history of the production strain. The process used for the generation of sufficient quantity of the production organism to provide an inoculum may have an impact on the performance during the production run.

Additionally, history further has an impact during the production bioreactor run (and also in the inoculum preparation culture run). The conditions change during the culture process as biomass increases, waste product levels change and nutrient are consumed amongst other changes. Such changes also potentially affect the DNA construct itself. As such the complexity due to the number of interacting factors makes practical experimentation essential.

In mammalian cell cultures a further challenge arises from the fact that with most current established technologies the insertion of the DNA construct carrying the gene for the recombinant protein may be into the host cell genome may occur randomly. As such the nature of the DNA surrounding the insertion site can have a gross impact on the yield of the protein and the response to the factors described above.

There are of course many other factors impacting such processes.

Returning to FIGS. 1 and 2, the database in which the data is subsequently stored may exist in locally, at an enterprise level or be available more widely through internet-based access systems of varying degree of 'openness' commonly referred to as the 'cloud'. In cloud-based experimental design systems, data provided from a series of experimental sources may be curated and made available by different entities and then compared to improve subsequent experiment design.

In summary, known bioprocessing development systems require that a full cycle of experimentation be carried out before any refinement for the next set of test conditions are tested, there is an extended duration of development as the experiments iterate towards a conclusion and a very valuable input materials are used inefficiently much of it being wasted.

SUMMARY OF THE INVENTION

The present invention provides for the above problems of material supply to be alleviated. Experiment durations are shortened, data obtained from scarce, valuable materials are maximised and improved results achieved. In some embodiments the invention includes the capability for the scientist to apply bias and priority to such outcomes. To do this, the invention provides systems and methods for automating process development in bioprocessing environments in which the parameters used to execute an experiment run can be modified during the run based on data being generated in parallel in multiple, concurrent experimental systems.

According to a first aspect of the invention there is provided a method for automating process development in a bioprocessing environment. The method comprises: executing a first experiment run according to a set of parameters; retrieving a second real-time set of data of an experiment run being executed in parallel, analysing the retrieved first real-time set of data and the second real-time set of data to determine an adjusted set of parameters; and, modifying, based on the analysis, the parameters upon which the experiment run is being executed during execution of the run such that the run continues to be executed according to the modified set of parameters.

Thus, the invention directly leads to an increase yield of data and knowledge of the experimental space with thorough exploitation of all materials utilized in the execution of the run. This leads to significantly increased definition of the experimental space from a single experimental run and hence the reduction in the number of rounds of experimentation required and a resulting decrease in development cycles, associated reduction in the time consuming preparation of high value materials and an overall reduction in development cycle time in the industry with benefits for time to market, development costs and resources.

Additional benefits include the increased definition of the functional operating space for particular candidate therapeutics which increases the likelihood of scale-up of such processes to manufacturing scale and reduces the significant cost and commercial impact of delays late in development such as delayed launches, regulatory review issues, etc. Experimental parameters can be refined multiple times within a single set of experimental runs. Such refinement can occur on a dynamic basis i.e. as a measured parameter in the experiment reaches a pre-set boundary set, for example describing the target production process control parameters can be adjusted based on the dataset from the parallel experiments in process to adjust the control parameters and adjust the trajectory of the model process experiment in question. Thus, such a system could be used to execute targeted process development in which the experimental system dynamically identifies a series of parameter settings that can be applied to meet a target goal. Such a series of parameter settings, potentially differing, might be generated in all the parallel experiments providing alternative control strategies. Such systems provide clear understanding of the boundaries of a region of poor performance for a particular candidate therapeutic protein to become apparent in the experiment allowing the experiments to be re-tasked to obtain a different result or examine a different condition or criteria.

Benefits may be made possible by interconnected units and parallel experimentation and systems which are connected to share data. Through the parallel monitoring of the data, such as protein status, using in/on-line analysis, more useful sets of parameter values can be automatically identified by the system through combined analysis of all of the experiments underway and the experiments in the problem area 're-tasked' through the automatic adjustment of the experiment values. If conditions are identified in one experiment, another experiment can be modified to ensure the condition does not occur or parameters adjusted to ensure that the experiment is re-tasked for a different purpose based on the analysis of the other experiment.

For example, if one experiment within a parallel run shows increased utilization of a valuable material, the conditions of the other experiment can be adjusted so that the utilization is tested in the other environment or the environment amended to the same to achieve that same high utilization.

The method allows for full exploitation of extended processes such as perfusion allowing multiple experiments to be carried out in combination with automated process/experiment design.

The analysis step may include comparing the retrieved first real-time set of data against a predetermined set of criteria and in which the parameters are modified based on the comparison. The criteria may be set automatically or by an operator. In this way, for example, the method is able to determine at which point the experiment should be modified or indeed when.

Furthermore, the method may further comprise: retrieving a historical set of data of an experiment run previously executed, wherein the analysing step is performed based on the historical set of data. In this way experiments can be re-tasked to revisit an earlier set of parameters to repeat and confirm previous findings or explore areas of variation. Moreover, trends in previous experiments can be avoided or used to improve the current experiment. For example, if previous experiments tended in a particular direction the current experiment can be modified if the same trend is detected.

Optionally the method may comprise retrieving a third-party set of data of an experiment run executed by a third party. The third-party set of data may be retrieved from a cloud computing system or from a local database. The analysing step may be performed based on the third-party set of data. Thus trends or experience from other experiments run by others can be utilized to improve the current experiment.

The set of data may include one or more selected from a group comprising yield, protein conformation, protein function, protein concentration, viscosity, derived pH, conductivity, media composition, gas utilization, cell health and status parameters. The parameters may be measured directly or indirectly during the execution of the experiment.

The parameters may include one or more selected from a group comprising: pH, media composition, temperature, gas supplies, pressure, flow rates and mixing criteria. Many other parameters exist that may be of importance and could be identified by expert in the art and will be identified in the future, for example specific micro nutrients.

The method may further comprise retrieving a target outcome and a set of boundary conditions, wherein the analysing step is performed based on the retrieved target outcome and set of boundary conditions. The automation is thus controlled within a defined set of limits and towards a particular goal or outcome. The conditions and outcome may be set by the operator. For example, yield of functional protein may be maximised through one or more series of parameter changes such that the parameter values used remain within defined pre-set boundaries, thus automatically creating a manufacturing process that fits one or more of a pre-existing set of 'platform' manufacturing processes.

The analysis step may comprise extrapolating the experiment to predict experiment data. In this way the art is improved since the extrapolation may occur from real data and actual samples rather than only extrapolating from related materials. For example, data never tested before in this fashion can be extrapolated more accurately as more data is retrieved. Moreover, in some embodiments data from parallel runs can be used to improve the extrapolation.

According to a second aspect of the invention, there is provided a system for automating process development in a bioprocessing environment, the system comprising: an executing unit configured to execute a first experiment run according to a set of parameters; and, an analysis unit configured to: retrieve a first real-time set of data of the experiment run while the experiment run is being executed; and, analyse the retrieved first real-time set of data to determine an adjusted set of parameters, wherein the executing unit is further configured to modify, based on the analysis, the parameters upon which the experiment run is being executed during execution of the run such that the run continues to be executed according to the modified set of parameters.

The analysis unit may be further configured to compare the retrieved first real-time set of data against a predetermined set of criteria and in which the parameters are modified based on the comparison. The analysis unit may be further configured to: retrieve a second real-time set of data of an experiment run being executed in parallel, wherein the analysis is performed based on the second real-time set of data. The system may include an interconnected control units and a database which may be local to the units. The sets of data may be stored in a database which may be in the cloud, remotely or local to the parallel experiments.

The analysis unit may be further configured to: retrieve a historical set of data of an experiment run previously executed, wherein the analysis is performed based on the historical set of data. The analysis unit may be further configured to: retrieve a third-party set of data of an experiment run executed by a third party, the third-party set of data being retrieved from a cloud computing system, wherein the analysis is performed based on the third-party set of data. In theory any remote computing system may be used. The set of measured data collected dependent on the system and process under study may include one or more selected from a group including yield, protein conformation, protein function, protein concentration, viscosity, derived pH, conductivity, media composition, gas utilization, cell health and status parameters. The parameters may be measured directly or indirectly during the execution of the experiment. The parameters may include one or more selected from a group comprising: pH, media composition, temperature, gas supplies, pressure, flow rates and mixing criteria. The parameters may be parameters controlling a run dependent on the system and process under study. The analysis unit may be further configured to: retrieve a target outcome and a set of boundary conditions, wherein the analysis is performed based on the retrieved target outcome and set of boundary conditions. The analysis unit may be further configured to: extrapolate the experiment to predict experiment data.

According to a third aspect of the invention a computer program is provided which, when executed by a processor, causes the processor to carry out a method according to any of the above aspects. A computer-readable medium storing a computer program may also be provided.

DETAILED DESCRIPTION

Examples of systems and methods in accordance with the invention will now be described with reference to the accompanying drawings, in which:—

FIG. 1 shows an experiment design approach in known bioprocessing development;

FIG. 2 shows a known design approach in chemistry synthesis;

Figure 4:
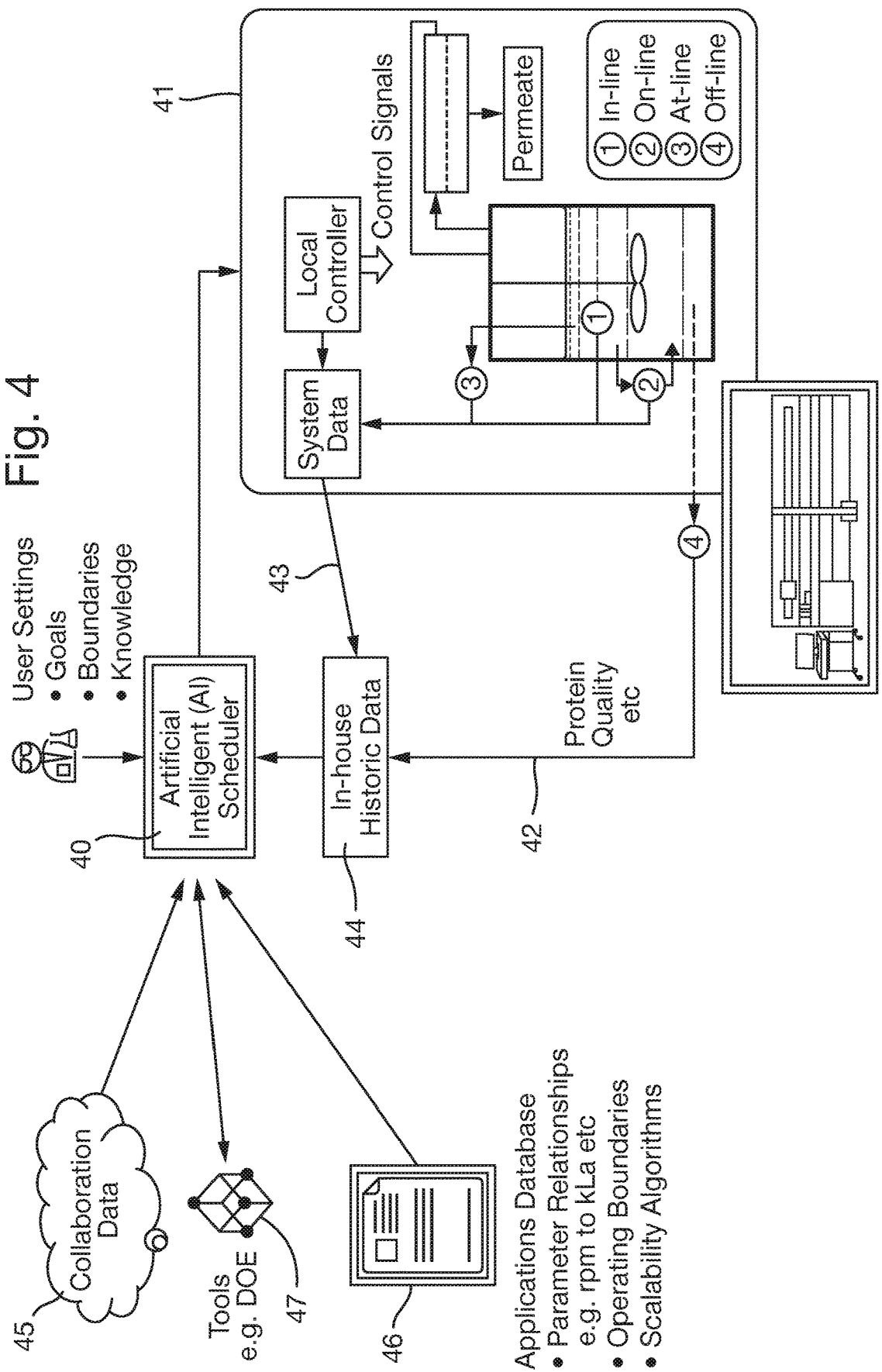
Figure 5:
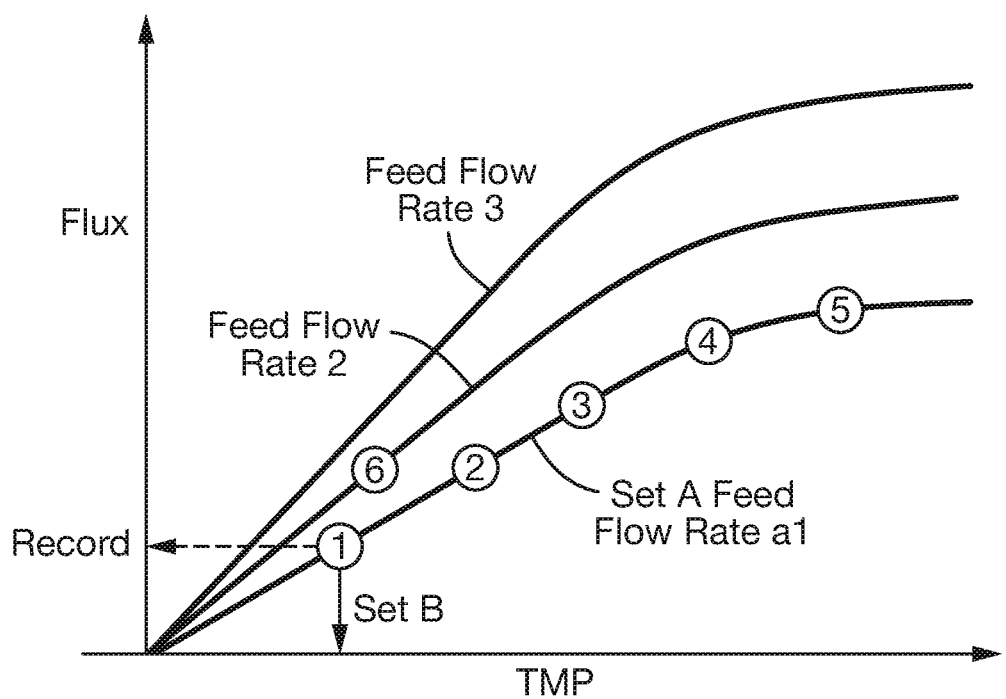
Figure 6:
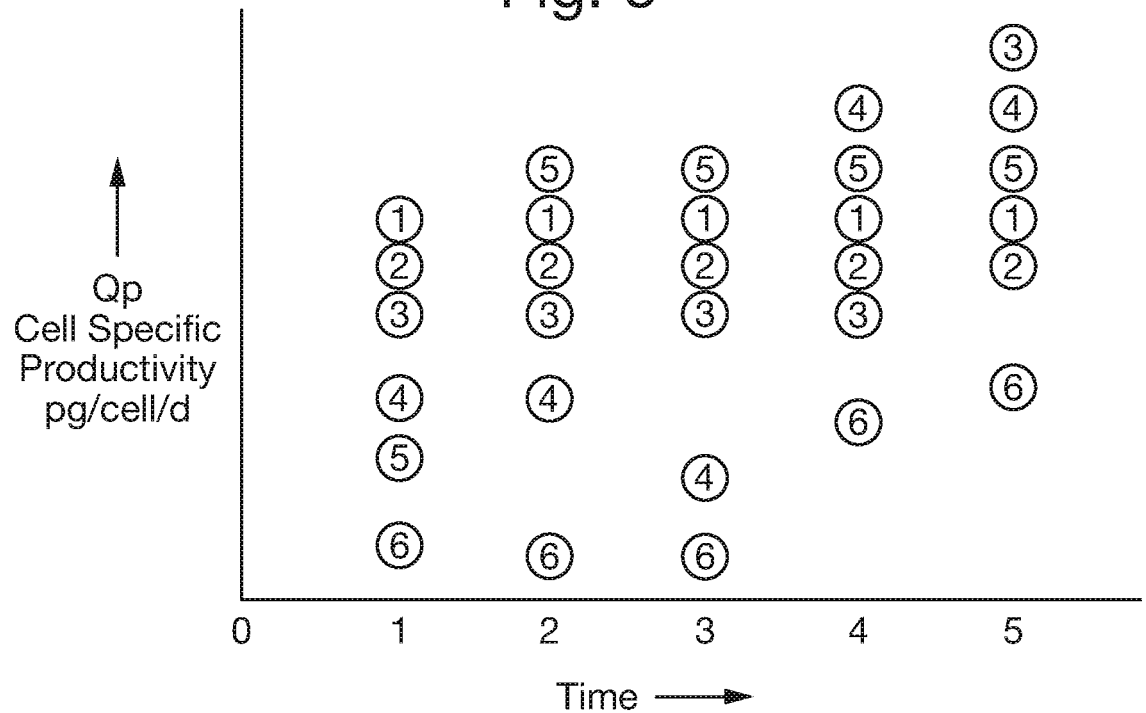

FIG. 4 demonstrates an exemplary architecture in which an embodiment of the present invention can be performed;

FIG. 5 shows an iterative process according to an embodiment of the present invention for identifying optimal experiment parameters; and, FIG. 6 shows an example set of data from parallel experiment runs of a hypothetical experiment.

The following are examples of systems and methods for dynamic experimental design and execution. An artificial intelligence based method is provided for monitoring multi-experiment designs dynamically during an experiment as illustrated in FIG. 1. The present invention may be embodied in a control system, automation unit, measurement devices, scheduler, software package operating on a computer with necessary inputs or on an artificial intelligence software package. Each term may be used interchangeably to refer to a computer unit connected to data outputs of one or more experiments.

Optionally the process begins with a software package designing a set of parameters for a particular experiment or set of parallel experiments (step 30). The parameters may be adjusted manually by an operator or of course may be entirely set manually according to the experience of the scientist. The experiment then proceeds to be run (step 11) with manual initiation or may be initiated in a fully automated fashion in a system with appropriate robotics. In the known manner, the run is executed in an automated fashion (step 12). During execution, data is extracted from the experiment (step 31) and is analysed by the artificial intelligence or software package (step 32). A modified experiment design is determined (step 33) and the experiment continued based on the modified experiment design and set of parameters chosen for that experiment. The cycle of analysis and adjustment may be at fixed time intervals or 'continuous'

Embodiments of the invention provide for the development of systems capable of executing multiple complex processes in parallel under the control of a single system. Data may be used from one such experiment to adjust the parameter settings of an experiment being carried out in parallel in a dynamic fashion effectively creating a large number of dynamically adjusted experiments utilising data generated from each other in combination with existing data that may be present in a number of forms and virtual locations.

A simplified hypothetical example will now be described. The pH setting for six of the bioreactors in an experimental run is 7.0. For another set of six bioreactors in the same run it is 7.5. During the experiment on-line real time analysis indicates that the lower pH is a principal component of lower productivity. In response to this the system adjusts the pH to a higher value to enable increased depth of analysis of other parameters (or the value of a pH step) in achieving the goal of higher productivity.

In addition to the above singular process, the algorithms comprising the process may extract data from historic databases and combine this with dynamic real time data of the experiments being run.

One advantage of the dynamic design approach is that as the boundary of the poor performance region becomes apparent in the experiment. Through the parallel monitoring of the protein status using in/on-line analysis systems, more useful sets of parameter values can be automatically identified by the system through combined analysis of all of the experiments underway and the experiments in the problem area 're-tasked' through the automatic adjustment of the experiment values.

Such re-tasking during the experiment can be utilized in a number of additional ways, for example in a system that automatically runs the component of experiments of a DOE in a sequential manner the parameter sets for subsequent experiments can be based on those of experiments within the automated run in a fully automated fashion.

Additionally, the utilization of different statistical approaches to identify optimal operating conditions and performance plateaus for operating conditions such as 'hill climb algorithms'.

The dynamic design approach also allows an experiment to be re-tasked to revisit/replicate an earlier set of experimental parameters to repeat and confirm previous findings within the experiment to explore levels of variation or to understand changes within the condition of a key part of the experimental system, such as the development or depletion of a gel layer on the filter in a UF/DF system.

It has previously been described that the dynamic design approach has particular utility in parallel experimental runs where experiments are designed using different conditions and run in parallel to provide a series of data in a short time. In extended experimental runs such as perfusion cell culture where stable conditions can be established, the operator may set the parameter conditions, allow the running bioreactor to become stable and then follow a read-out for a period of stable operation. The operator would then adjust the operating parameter settings, allow the system to stabilize and then again follow the readout. The invention is particularly powerful in such cases in that firstly it allows the automation of such systems and the n+1 set of parameter values can automatically be based on those from experiment n. Even more powerful is the application of such approaches in parallel systems, for example a multiple parallel bioreactor system capable of running many sequential experiments. Data from all the experiments under execution within the parallel system run can be combined to define the parameter vales for the next stage of the experiment in any one bioreactor.

Also in such cases there is no requirement of the completion of a particular experimental phase before re-tasking based on other data collected in the system occurs.

Re-tasking and calculation of new parameter values during the run may involve machine learning or other forms of AI and existing local and remote data sets.

Figure 3:
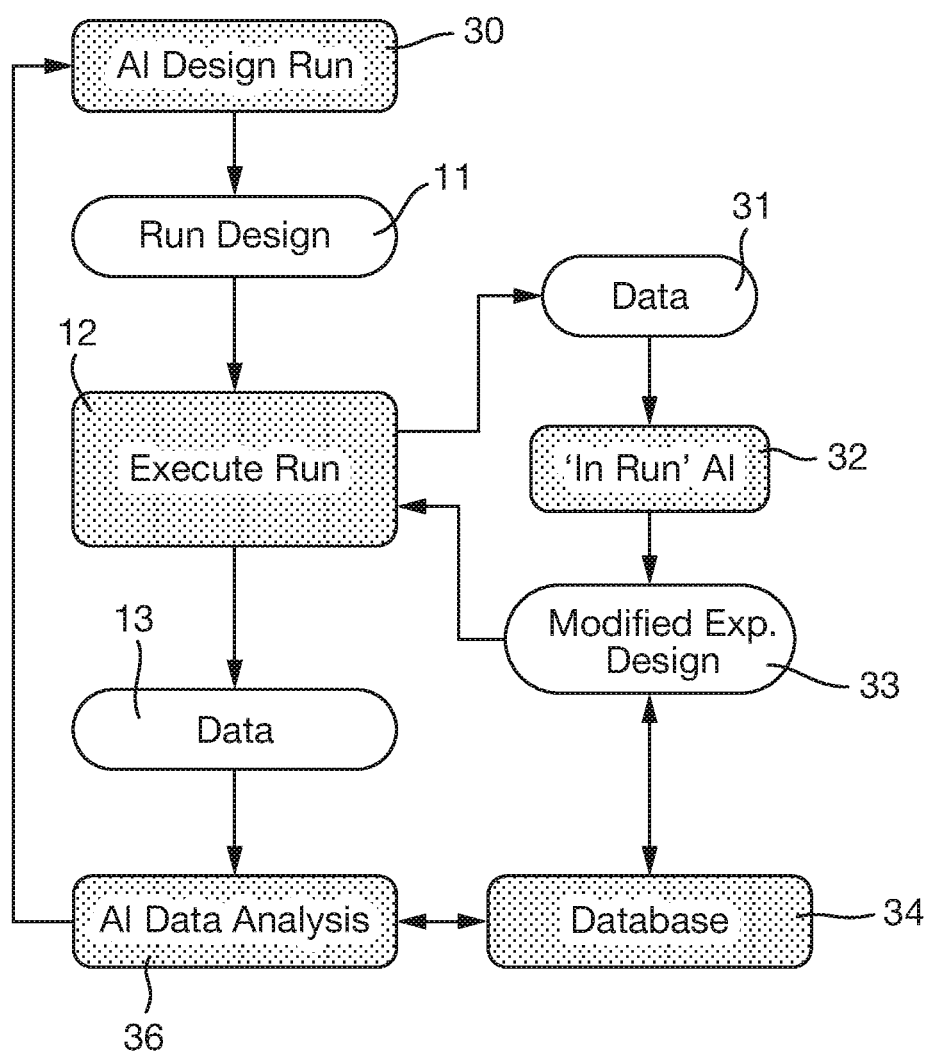
FIG. 3 shows a flow diagram of a first embodiment of the present invention.

Referring once again to FIG. 3, at the conclusion of the experiment, the data is extracted and analysed (steps 13 and 36) before a new experiment or set of parameters is designed and the process is iterated. The data analysis, modified in-experiment design and during run data may all be stored in a database (step 34). The control system may identify a next step set of experiments to be executed and simply issue an instruction for request that a technician to resupply the system with a set of defined consumable components (where these are not simply configured for automated supply to the system), and to confirm completion of loading. After which the system would execute the run (step 11).

The systems may generate novel additional data and the addition of that to a database may increase the discriminatory power of the historic database (step 34). The enhanced information content of this database will increase the success and speed of such a system.

An exemplary architecture in which the above may be embodied is illustrated in FIG. 4. System components are illustrated, in for example a bioreactor system. The artificial intelligence scheduler is shown as item 40 and in communication with the other elements of the system. The scheduler will first provide input into the experiment system 41. The experiment system generates system data measured or derived directly on the experimental system in real time which may be transferred into and/or via a local controller which additionally provides control signals for the experiment. System data is output 43 together with data measured indirectly through the processing of samples of the experimental system external to the system and analysed to generate data 42 relating to the experiment status, such as protein quality or yield, to a database which is itself in communication with the scheduler. That is, the scheduler retrieves data of the experiment from a database 44. Optionally of course it may retrieve this data directly.

The scheduler may receive inputs from the operator to aid in defining the experiment parameters. These may be goals, boundaries or other knowledge the scheduler is not aware of but the operator may have that may aid in defining the experiment.

The scheduler 40 may retrieve data from and upload data to the cloud, illustrated here as collaboration data 45. In this way the scheduler may learn from experiments run by third parties and may help others for mutual benefit.

A key part of the architecture is an applications database 46 with which the scheduler 40 is in communication. The applications database 46 typically might contain information on the operation of such systems and requirements of known and presumed applications and may aid in defining the experiment and may include parameter relationships such as rpm to KLa etc., operating boundaries for the experiments as well as scalability algorithms to aid in the parameter modification.

Tools 47 may be used by the scheduler such as DOE tools which may aid in the experimentation process. Optionally, the scheduler may include a series of APIS to enable interface with third party tools.

It will be clear to the skilled person that the database and scheduler may be comprised in one system where appropriate or may be made up or multiple functionally separated blocks.

The flow charts and descriptions thereof should not be understood to prescribe a fixed order of performing the method steps described therein. Rather, the method steps may be performed in any order that is practicable. Methods and processes described herein can be embodied as code (e.g., software code) and/or data. Such code and data can be stored on one or more computer-readable media, which may include any device or medium that can store code and/or data for use by a computer system. When a computer system reads and executes the code and/or data stored on a computer-readable medium, the computer system performs the methods and processes embodied as data structures and code stored within the computer-readable storage medium. In certain embodiments, one or more of the steps of the methods and processes described herein can be performed by a processor (e.g., a processor of a computer system or data storage system). It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); network devices; or other media now known or later developed that is capable of storing computer-readable information/data. Computer-readable media should not be construed or interpreted to include any propagating signals.

One example to which the invention might be applied is the automated optimization of mammalian culture parameters in a bioreactor in order to achieve maximum yield.

The interest of the user is in identifying the optimal conditions providing the highest yield of a recombinant protein produced by the mammalian cell line being cultured. Key parameters known generally to have an effect on the yield of recombinant CHO strains in bioreactors are varied in experiments designed using statistical principles (Design Of Experiments (DOE)) to identify the relative effect of each of the factors being varied. An experiment involving two factors being varied typically involves 16 individual experiments in one run of an automated parallel bioreactor system such as the Sartorius ambr250HT system capable of supporting 24 bioreactors in parallel. pH and temperature are known to impact the yield of functional protein and the range explored for such values in culture is shown in Table 1 with low, medium and high values for each parameter being defined

TABLE 1

Parameter value ranges for testing

| Level | L | M | H |
|---|---|---|---|
| pH | 6.5 | 7.0 | 7.5 |
| Temp | 32 | 35 | 38 |

Using a Central Composite Face (CCF) Design of Experiment with 4 centre points, 12 individual experimental runs are defined as shown in Table 2 to explore the significance of each factor in determining yield and the interactions between those factors.

TABLE 2

| Experiment | pH | Temp |
|---|---|---|
| 1 | 6.5 | 32 |
| 2 | 6.5 | 35 |
| 3 | 6.5 | 38 |
| 4 | 7.0 | 38 |
| 5 | 7.5 | 38 |
| 6 | 7.5 | 35 |
| 7 | 7.5 | 32 |
| 8 | 7.0 | 32 |
| 9 | 7.0 | 35 |
| 10 | 7.0 | 35 |
| 11 | 7.0 | 35 |
| 12 | 7.0 | 35 |

The bioreactors are set with the appropriate parameter set-points up by the operator and the experiment initiated with these conditions. The production of functional recombinant protein is measured on a regular basis using either an in-line assay system (such as Ramen, NIR) or regular manual or automated sampling, for example in the widely used Sartorius ambr250 or ambr15 systems, to either an integrated at-line or an off-line analyser (such as Pall fortebio Octet system, Nova Biomedical Bioprofile Flex system) and the data recorded directly by the system or transferred manually or directly electronically to the system.

Following a certain duration of culture it becomes clear that Experiments 1 to 3 do not yield any protein and the associated algorithm applied to the data identifies that such effect is significantly associated with the pH of the bioreactor. It is determined by the algorithm that continuing such experiments at pH<7.0 would be of no value beyond establishing that protein yield at pH 6.5 is insignificant. The system is programmed so that in such a case the pH is automatically adjusted based on the pH of bioreactors in the same run known to be expressing protein at high levels. For example, in the case that the highest yield of protein in the parallel system is from bioreactors with pH set-points of pH7.5, the pH highest being tested, adjustment of the pH of the bioreactors 1 to 3 to pHs of 7.8, higher than that that of the high producing bioreactors, allows the upper limit of pH for yield to be explored in the same experiment utilising resources that would otherwise have been wasted. Therefore, an additional round of experimentation may be negated or reduced in scale.

Such approaches could be applied to a number of bioprocessing criteria relating to primary production in microbial or cell cultures, for example protein quality traits or cell specific productivity (the production of target protein per cell per unit time, typically pg/cell/day). Equally such approaches might be applied to downstream processing applications, for example the optimization of pressure and flow parameters in ultrafiltration and diafiltration to optimise flux rates.

A number of strategies may be applied to take advantage of dynamic data generated in parallel automated systems. A further example is provided in below and illustrated in FIG. 6.

Six bioreactors are set-up and run initiated with the same putative production cell line and the productivity of the cells in each bioreactor is calculated and monitored over time. At specific time points, (the frequency of which might vary depending on the traits being measured and the analysis methodology used) an algorithm is applied to the data and based on specific settings for parameters in the algorithm the operating set points for a subset of the bioreactors is altered. For example in FIG. 6, the operating parameter set points are adjusted for the two lowest performing bioreactors, either to a pre-set formula or based upon the data from within those bioreactors and the other bioreactors within the run.

The performance of the bioreactors for the trait is then measured further and at time point 2 the two lowest performing bioreactors are adjusted. The process is then repeated allowing identification of more optimal conditions for the trait.

Depending on the detailed context of the experiment additional factors may need to be considered but the principle remains the same.

A number of variants of the approach are possible including:

- The design of any algorithm may be varied extensively with respect to the data considered in the performance assessment, the set of bioreactors from which data is considered, the subset of bioreactors on which parameters are altered, the strategy of the alteration i.e. to make the adjusted bioreactors more or less like those on which the performance metric has been measure as more optimal or distinct in some other dimension.
- The initial set of parameter settings for the bioreactors may be based on DOE whereas subsequent adjusted parameter setting are not or subsequent parameter sets may be based on DOE.
- Data from within each bioreactor may be utilized differently or weighted differently to other bioreactors from within the set, equally other individual bioreactors within the set may be weighted differently based on their current or historic performance.
- Data from sources external to the system and/or current may be utilized including data from local knowledge databases based on previously acquired data, enterprise level databases, external private and public data bases and also through dynamic requests for expert person input.

Using data collation from parallel runs a number of approaches to automated process development are possible.

In FIG. 6 it could for example be identified that the total accumulated product in reactor 5 was higher than any other bioreactor or this might be combined with other parameters such as activity, or % of molecules a specific structural form. This may be the result of specific physiological events triggered by the variation in bioreactor conditions providing the appropriate environment optimal for the trait that would not have otherwise been identified due to the complex nature of the biology. The series of parameter settings for reactor 5 may then be taken as the most optimal process for manufacture and transferred to larger production scale systems or used as the basis for further process development or research. Algorithms may be specifically designed for such automated process development.

Algorithms may be designed for such experiments including boundary conditions for the traits being assessed. For example, in the above experiment, it is generally known that cell productivities of 20 pg/cell/h or higher are achievable in mammalian cultures. The algorithms may be designed such that if the productivity in a particular reactor is below a set threshold value or some function of that of other reactors in the same run the parameter settings may be adjusted to a value predicted by the system to provide more yield based on the parameter settings being used with high yielding and low yielding bioreactors in the same run. Operational settings in such algorithms could be designed to cluster around parameters known to be high yielding or to explore other distinct regions of experimental space or both.

Such algorithms may use both data from other bioreactors running concurrently in the same system, historical data held within the system or in an enterprise database or third party data.

Further boundary values for operational parameters in such algorithms may be set such that they relate to one or more of a set of platform manufacturing processes used by the manufacturing company. As such any such automatically derived process would effectively optimised to operate within those boundaries and therefore by directly applicable to the manufacturers standard operating processes.

Other strategies enabled by parallel automated systems include the delay of the progression of certain experimental units within the parallel system relative to others; for example delaying the start of bioreactors 4-6 until after bioreactors 1-3 would allow data on the start-up phase from the first set of bioreactors to be used to optimise the start-up phase for the second set of bioreactors. Such delays might easily be programmed into an automated system and combined with the aforementioned approaches. Approaches used might include automated reduction in the temperature of certain bioreactors in the run to delay the progression of those cultures until a specific time point.

Additionally, strategies include distribution of one experimental unit to many; for example, samples from one bioreactor of a set of parallel bioreactors that is identified as having a specified performance (highest, lowest etc.) for a particular trait might be used to inoculate other parallel, but as yet unseeded bioreactors in the same system. For example, the first set of bioreactors from which the chosen bioreactor is selected might contain different cell lines, the most effective of these then being selected for process development Above, processes have been described in which experiments can be designed to be dynamically assessed and individual experiments 're-tasked' to explore new parameter ranges once the value of a first set of parameter conditions has been evaluated against set measures including other experimental parameter sets running in the same parallel experimental system. The dynamic design enables a user to: load a 'target outcome' and boundary conditions for the process; be free of intensive interaction with the system other than loading supplies and removing waste; and, receive a final process design optimal for a scaled-up reactor system with reduced time and cost of materials. The approach has particular value in that decisions on optimal experimental design can come once the experiment has started and also be implemented before the next round of experimentation—hence the number of rounds of evaluation required is reduced. Such approaches are beneficial due to the complexity of such biological systems and limited capability to predict the outcome, particularly in the early stages of developments when working with new and novel proteins. Further, full automation of sequential experimentation with automated evolution of the experimental design but within a single experimental run is allowed and finally but not exclusively, the approach allows for the use of experimental data from parallel channels in the same experimental system.

The dynamic design approach for process development for a broad range of applications, including but not limited to: selection of biological products for therapeutic and industrial purposes; upstream biological process development e.g. for biological pharmaceutical production, industrial product fermentation, cell based therapy processes etc.; downstream process development e.g. for biopharmaceutical product purification, industrial bio-product purification;

formulation of biological molecules for therapy; and. non-biological applications in which parallel experimentations and/or sequential stages of experimentation are used for process development.

It can therefore be seen that the dynamic design approach described provide key benefits such as: reduced development cycles; increased efficiency of use of limited resources with significant added value; reduced costs through decreased labour, facilities time, resources; decreased project management complexity; and, increased power and significance of results.

The invention claimed is:

1. A method for automating process development in a bioprocessing environment, the method comprising:
executing a first experiment run according to a set of parameters, the set of parameters including one or more parameters indicated to have an impact on the performance of the first experiment run;
retrieving a first real-time set of data of the first experiment run while the first experiment run is being executed;
retrieving a second real-time set of data of a second experiment run being executed in parallel to the first experiment run;
analyzing the retrieved first real-time set of data and the second real-time set of data to determine an adjusted set of parameters, the analyzing comprising determining that the second experiment run is performing better than the first experiment run;
modifying, based on the analysis, the set of parameters upon which the first experiment run is being executed during execution of the first experiment run such that the first experiment run continues to be executed according to the modified set of parameters, the modifying including modifying the one or more parameters indicated to have an impact on the performance of the first experiment run; and
allowing the second experiment run to continue without modified parameters.

2. The method according to claim 1, in which the analyzing step includes comparing the retrieved first real-time set of data against a predetermined set of criteria and in which the one or more parameters are modified based on the comparison.

3. The method according to claim 1, in which the method further comprises:
retrieving a historical set of data of an experiment run previously executed, wherein the analyzing step is performed based on the historical set of data.

4. The method according to claim 1, in which the method further comprises:
retrieving a third-party set of data of an experiment run executed by a third party, the third-party set of data being retrieved from a cloud computing system,
wherein the analyzing step is performed based on the third-party set of data.

5. The method according to claim 1, in which the fit and second real-time sets of data include one or more selected from a group comprising yield, protein conformation, protein function, protein concentration, viscosity, derived pH, conductivity, media composition, gas utilization, cell health, and status parameters.

6. The method according to claim 1, in which the one or more parameters include one or more selected from a group comprising: pH, media composition, temperature, gas supplies, pressure, flow rates and mixing criteria.

7. The method according to claim 1, further comprising:
retrieving a target outcome and a set of boundary conditions,
wherein the analyzing step is performed based on the retrieved target outcome and set of boundary conditions.

8. The method according to claim 1, in which the analyzing step comprises extrapolating the experiment to predict experiment data.

9. A system for automating process development in a bioprocessing environment, the system comprising:
an executing unit comprising a bioreactor and a control system configured to execute a first experiment run within the bioreactor according to a set of parameters, the set of parameters including one or more parameters indicated to have an impact on the performance of the first experiment run; and
an analysis unit comprising a computer system configured to:
retrieve a first real-time set of data of the first experiment run while the first experiment run is being executed;
retrieve a second real-time set of data of a second experiment run being executed in parallel to the first experiment run; and
analyze the retrieved first real-time set of data and the retrieved second real-time set of data to determine an adjusted set of parameters, the analyzing comprising determining that the second experiment run is performing better than the first experiment run,
wherein the executing unit is further configured to modify, based on the analysis, the set of parameters upon which the first experiment run is being executed during execution of the first experiment run such that the first experiment run continues to be executed according to the modified set of parameters while the second experiment run is executed without modified parameters.

10. The system according to claim 9, in which the analysis unit is further configured to compare the retrieved first real-time set of data against a predetermined set of criteria and in which the one or more parameters are modified based on the comparison.

11. The system according to claim 9, in which the analysis unit is further configured to retrieve a historical set of data of an experiment run previously executed, wherein the analyzing is performed based on the historical set of data.

12. The system according to claim 9, in which the analysis unit is further configured to:
retrieve a third-party set of data of an experiment run executed by a third party, the third-party set of data being retrieved from a cloud computing system,
wherein the analysis is performed based on the third-party set of data.

13. The system according to claim 9, in which the first and second real-time sets of data include one or more selected from a group comprising yield, protein conformation, protein function, protein concentration, viscosity, derived pH, conductivity, media composition, gas utilization, cell health, and status parameters.

14. The system according to claim 9, in which the one or more parameters include one or more selected from a group comprising: pH, media composition, temperature, gas supplies, pressure, flow rates and mixing criteria.

15. The system according to claim 9, in which the analysis unit is further configured to:
retrieve a target outcome and a set of boundary conditions, wherein the analysis is performed based on the retrieved target outcome and set of boundary conditions.

16. The system according to claim 9, in which the analysis unit is further configured to: extrapolate the experiment to predict experiment data.

17. A non-transitory computer-readable medium storing a computer program that, when executed, is operative to:
- execute a first experiment run according to a set of parameters, the set of parameters including one or more parameters indicated to have an impact on the performance of the first experiment run;
- retrieve a first real-time set of data of the first experiment run while the first experiment run is being executed;
- retrieve a second real-time set of data of a second experiment run being executed in parallel to the first experiment run;
- analyze the retrieved first real-time set of data and the second real-time set of data to determine an adjusted set of parameters, the analyzing comprising determining that the second experiment run is performing better than the first experiment run; and
- modify, based on the analysis, the set of parameters upon which the first experiment run is being executed during execution of the first experiment run such that the first experiment run continues to be executed according to the modified set of parameters while the second experiment run continues without modified parameters.

* * * * *